US008896314B2

(12) United States Patent
Südow

(10) Patent No.: US 8,896,314 B2
(45) Date of Patent: Nov. 25, 2014

(54) MULTIPLE COMPONENT ELECTROMAGNETIC SURVEY SIGNAL ACQUISITION METHOD

(75) Inventor: Gustav Göran Mattias Südow, Vällingby (SE)

(73) Assignee: PGS Geophysical AS, Oslo (NO)

( * ) Notice: Subject to any disclaimer, the term of this patent is extended or adjusted under 35 U.S.C. 154(b) by 623 days.

(21) Appl. No.: 12/799,941

(22) Filed: May 5, 2010

(65) Prior Publication Data

US 2011/0273179 A1    Nov. 10, 2011

(51) Int. Cl.
*G01V 3/00* (2006.01)
*G01V 3/12* (2006.01)

(52) U.S. Cl.
CPC ........................... *G01V 3/12* (2013.01)
USPC ........... 324/365; 324/347; 324/348; 324/358; 324/334

(58) Field of Classification Search
USPC .......... 324/347, 348, 357, 358, 365; 343/703, 343/709, 718–719
See application file for complete search history.

(56) References Cited

U.S. PATENT DOCUMENTS

| 7,446,535 | B1 | 11/2008 | Tenghamn et al. |
| 7,602,191 | B2 | 10/2009 | Davidsson |
| 7,974,151 | B2 | 7/2011 | Iranpour et al. |
| 2006/0238200 | A1* | 10/2006 | Johnstad .................. 324/337 |
| 2007/0294036 | A1* | 12/2007 | Strack et al. ................ 702/14 |
| 2008/0239875 | A1* | 10/2008 | Alumbaugh et al. ......... 367/131 |
| 2009/0140741 | A1* | 6/2009 | Tenghamn et al. ........... 324/347 |
| 2010/0102821 | A1* | 4/2010 | Alumbaugh et al. ......... 324/334 |

FOREIGN PATENT DOCUMENTS

| WO | 2008/032082 A1 | 3/2008 |
| WO | 2008032082 A1 | 3/2008 |

OTHER PUBLICATIONS

United Kingdom Search Report for Application No. GB1107448.1, Mailing Date: Aug. 24, 2011.
Powell, Greg, Patent Examination Report No. 1, IP Australia, Oct. 22, 2013, Australia.
Veale, Matthew, Patents Act 1977: Examination Report under Section 18(3), Intellectual Property Office, Nov. 25, 2013, United Kingdom.

* cited by examiner

*Primary Examiner* — Arleen M Vazquez
*Assistant Examiner* — Son Le

(57) ABSTRACT

A method for marine electromagnetic surveying includes transmitting a first electromagnetic field oriented in a first direction into a body of water. A second electromagnetic field oriented in a second direction is transmitted into the body of water, wherein the second direction is substantially transverse to the first direction. A parameter related to electromagnetic field amplitude is detected at a plurality of longitudinally and laterally spaced apart positions behind a vessel. The components of the detected electromagnetic field parameter are resolved into components along the first and second directions by using the geometrical symmetries and asymmetries of the transmitting source. Systems for implementing such methods are also provided.

14 Claims, 2 Drawing Sheets

MULTIPLE COMPONENT ELECTROMAGNETIC SURVEY SIGNAL ACQUISITION METHOD

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates generally to the field of marine electromagnetic surveying of subsurface rock formations. More specifically, the invention relates to systems for simultaneously acquiring in-line (common transmitter and receiver dipole moment orientation) and cross-line (transmitter and receiver having orthogonally disposed dipole moments) electromagnetic signals.

Marine controlled source electromagnetic (CSEM) surveying is a geophysical surveying technique that uses electromagnetic (EM) energy to identify possible hydrocarbon bearing rock formations below the bottom of a body of water such as a lake or the ocean. In a typical marine CSEM survey, an EM source is typically towed over an area of interest in the Earth's subsurface, and a number of EM sensors are disposed on the water bottom over the area of interest to obtain signals related to the distribution of electrical resistivity in the subsurface area of interest. Such surveying is performed for a range of EM source and EM sensor positions. The EM source emits either or both a time varying electric field and a time varying magnetic field, which propagate outwardly into the overlying seawater and downwardly into the formations below the water bottom. The sensors most commonly used detect and record the induced electric field at or near the water bottom. The time varying EM field may be induced by passing electric current through an antenna. The electric current may be continuous wave and have one or more discrete frequencies. Such current passing through an antenna is used for what is referred to as "frequency domain CSEM" surveying. It is also known in the art to apply direct current to an antenna, and to produce transient EM fields by switching the current. Such switching may include, for example, switching on, switching off, inverting polarity, and inverting polarity after a switch-on or switch-off event. Such switching may be sequenced in time, for example, equally time spaced, or in a time series known as a "pseudo random binary sequence." Such switched current is used to conduct what is referred to as a "transient CSEM" or "time domain CSEM" survey. It is also known in the art to tow the EM receivers on cables, in a manner similar to the sensor cables ("streamers") used in a common type of marine seismic surveying.

The EM energy is rapidly attenuated in the conductive seawater, but in less conductive subsurface formations is attenuated less and propagates more efficiently. If the frequency of the EM energy is low enough, the EM energy can propagate deep into the subsurface formations. Energy "leaks" from resistive subsurface layers, e.g., a hydrocarbon-filled reservoir, back to the water bottom. When the source-sensor spacing ("offset") is comparable to or greater than the depth of burial of the resistive layer (the depth below the water bottom), the energy reflected from the resistive layer will dominate over the transmitted energy. CSEM surveying uses the large resistivity contrast between highly resistive hydrocarbons and conductive aqueous saline fluids disposed in permeable subsurface formations to assist in identifying hydrocarbon reservoirs in the subsurface.

In an example relevant to the present invention, the sensor layout in an EM streamer system typically consists of spaced apart electrode pairs distributed along the length of the streamer. Voltage measuring circuits are associated with each of the electrode pairs, or may be switchably associated with more than one pair of such electrodes. Voltage measurements across the pairs of electrodes in response to the detected electric field amplitude are transmitted to a recording unit on the survey vessel for interpretation, or for later interpretation at a different location. The foregoing arrangement is described, for example, in U.S. Pat. No. 7,446,535 issued to Tenghamn et al.

Multiple EM field component acquisition in towed EM surveying is non-trivial due to the difficulty in measuring cross-line EM field components (i.e., components wherein the transmitter and receiver have orthogonally disposed dipole moments). Traditionally, the cross-line EM field components are omitted in EM data analysis as the main part of the information of the sub-surface structure can be found in the in-line electric field component (i.e., component wherein the transmitter and receiver share a common dipole moment orientation). However, the inability to measure cross-line EM field components reduces the uniqueness of the processed result, which is a drawback from a data analysis perspective. Cross-line electric field component acquisition can be realized, for example, through a multi vessel operation. However such a set-up is associated with significantly increased operational costs. There exists a need for multiple component EM data acquisition that avoids the complication of additional survey and/or towing vessels.

SUMMARY OF THE INVENTION

A method for marine electromagnetic surveying includes transmitting a first electromagnetic field oriented in a first direction into a body of water. A second electromagnetic field oriented in a second direction is transmitted into the body of water, wherein the second direction substantially transverse to the first direction. A parameter related to electromagnetic field amplitude is detected at a plurality of longitudinally and laterally spaced apart positions behind a vessel. The components of the detected electromagnetic field parameter are resolved into components along first and second directions by using the geometrical symmetries and asymmetries of the transmitting source.

Another method for marine electromagnetic surveying includes towing a first transmitter and a second transmitter through a body of water along a towing path. A first electromagnetic field oriented in a first direction is transmitted into the body of water, wherein the first direction is substantially parallel to the towing path. A second electromagnetic field oriented in a second direction is transmitted into the body of water, wherein the second direction is substantially transverse to the first direction. A parameter related to electromagnetic field amplitude is detected at a plurality of longitudinally and laterally spaced apart positions. The components of the detected electromagnetic field parameter are resolved into components along first and second directions by using the geometrical symmetries and asymmetries of the transmitting source.

Another aspect of the invention provides a marine electromagnetic survey system. The system comprises a first electromagnetic field source configured to transmit a first electromagnetic field oriented in a first direction into a body of water, wherein the first electromagnetic field source is disposed proximate a centerline of a streamer spread. The system further comprises a second electromagnetic field source configured to transmit a second electromagnetic field oriented in a second direction into a body of water, wherein the second direction is substantially transverse to the first direction. The system further comprises a plurality of electromagnetic sensors disposed on the streamer spread and having dipole moments generally parallel to the first direction and configured to detect a parameter related to electromagnetic field amplitude, wherein at least one electromagnetic sensor is disposed at a distance from the centerline.

Other aspects and advantages of the invention will be apparent from the following description and the appended claims.

DETAILED DESCRIPTION

Figure 1:
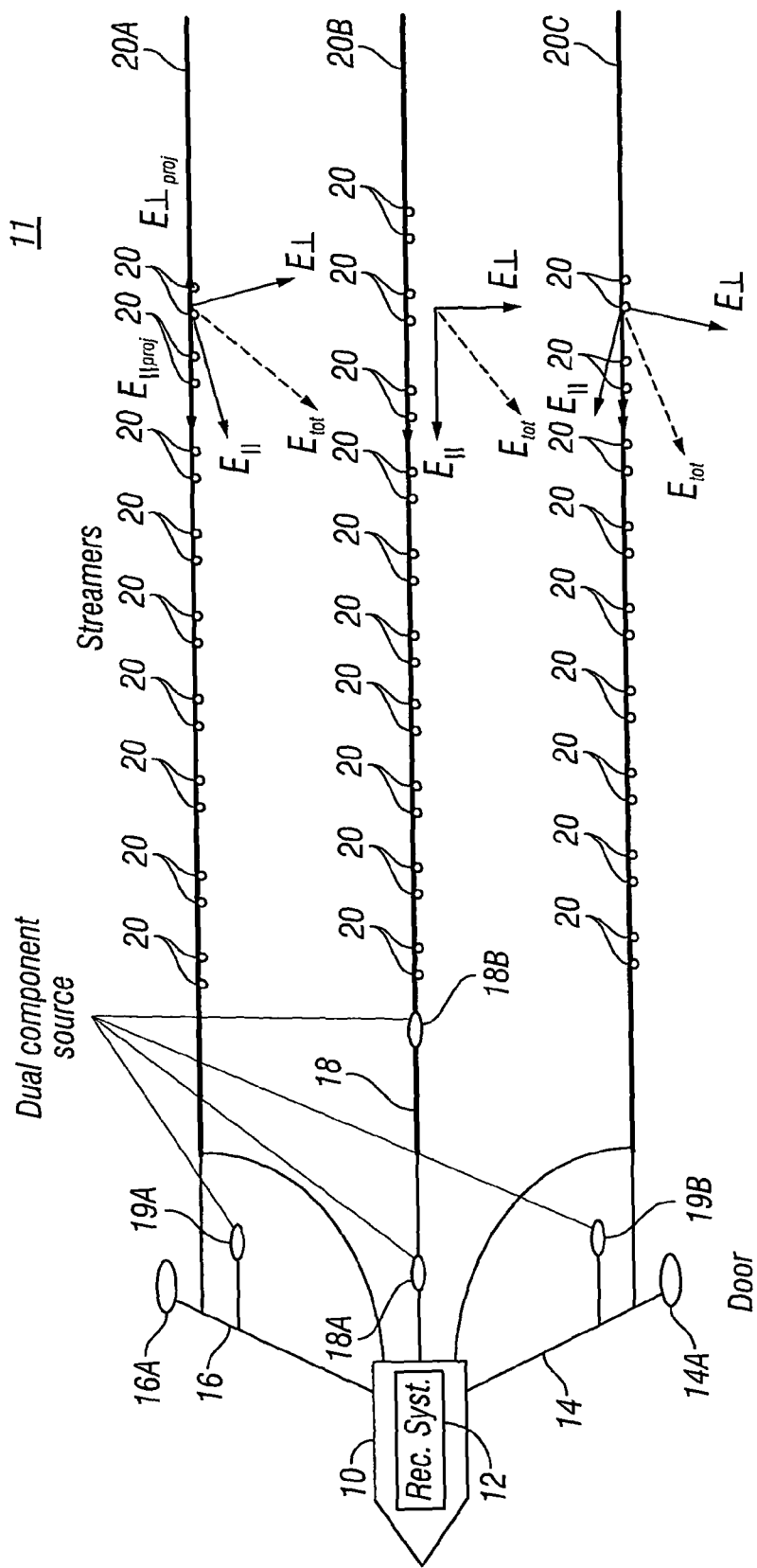
FIG. 1 is an example electromagnetic signal acquisition and recording system.

An example marine electromagnetic (EM) data acquisition and recording system is shown in FIG. 1. A survey vessel 10 moves along the surface of a body of water 11 such as a lake or the ocean. The vessel 10 includes equipment thereon, shown generally at 12 and for convenience referred to as a "recording system." The recording system 12 may include devices (not shown separately, generally known in the art) for navigation of the vessel 10, to apply electric current to EM transmitters (explained below), and to detect and record signals representing voltages impressed across pairs of electrodes 20 located at various offset distances from the EM transmitters (explained below). The recording system 12 may also include a computer system for interpreting the detected and/or recorded signals into electrical conductivity or other based images of the rock formations below the water bottom. In some embodiments, the computer system may resolve the recorded signals into in-line and cross-line electrical field components.

In the present example, the vessel may tow two EM transmitters. The first transmitter consists of a cable 18 towed in the direction of the vessel 10 having thereon two, longitudinally spaced apart electrodes 18A, 18B. At selected times, the recording system 12 passes electric current between the electrodes 18A, 18B. The current may be low frequency (e.g., about 0.01 to about 1.0 Hz) for frequency domain EM surveying, or may be direct current having one or more switching events, for example, switching current on, switching current off, reversing current polarity, or a series of switching events in a particular pattern, such as a pseudorandom binary sequence (PRBS). The first transmitter emits an EM field oriented generally in the direction of motion of the vessel, and can be referred to as the "in-line" transmitter. A second transmitter may consist of two electrodes, shown at 19A and 19B that may be mechanically connected to a laterally outward position along two of the "superwide" ropes 14, 16. The superwide ropes 14, 16 each can connect at an outward end thereof to a respective paravane or door 14A, 16A. The paravanes 14A, 16A provide lateral force as the vessel moves through the water 11 so as to maintain the lateral position ("spread") of each of a plurality of sensor streamers 20A, 20B, 20C with reference to the centreline of the vessel 10. As electric current is passed across electrodes 19A and 19B, an EM field is emitted that is in a direction transverse to the motion of the vessel 10. Such field may be referred to as the "cross-line" EM field. While the foregoing shows transmitters that are in the form of spaced apart electrodes, it should be clearly understood that similar results may be obtained, for example, by using solenoid coils wound 1) so that the magnetic dipole moment thereof is equivalent in position and direction to the electric dipole moment of the in-line transmitter and 2) wound so that the magnetic dipole moment of such coil is along the same direction as the electric dipole moment of the illustrated cross-line transmitter.

In operation, as explained above, the transmitters may be energized using various forms of switched direct current in order to perform time domain EM surveying. In one example, both transmitters may be operated simultaneously by using a different PRBS for each transmitter, and preferably sequences with a cross-correlation coefficient of substantially zero. Thus the in-line electric field component and the cross-line electric field component of the voltages induced in each electrode pair 20 can be identified.

In the present example, the streamers 20A, 20B, 20C may include a plurality of longitudinally spaced apart pairs of electrodes 20. Suitable amplification, data formatting and telemetry devices (none shown in FIG. 1) may be included in each streamer 20A, 20B, 20C to communicate voltage measurement signals to the recording system 12. The illustration in FIG. 1 is a plan view. It will be appreciated by those skilled in the art that the streamers 20A, 20B, 20C typically are towed at substantially greater depth in the water than are the transmitters.

The illustrated configuration has an in-line transmitter (electrodes 18A, 18B) and an orthogonal cross-line transmitter (electrodes 19A, 19B) towed proximate two doors 14A, 16A followed by the illustrated streamer spread (streamers 20A, 20B, 20C). In this illustrated streamer spread, in-line electrode pairs 20 on in-line streamer 20B are used to directly measure the in-line electric field component ($E_{\|proj}$). The cross-line EM field component is estimated through the measured electric field projection ($E_{\perp proj}$) onto the off-center streamers (20A, 20C as illustrated, but generally any streamer geometrically separated from the mirror plane of the in-line transmitter). This concept does not require a common reference electrode (see, e.g., U.S. Pat. No. 7,602,191 issued to Davidsson) and would thereby simplify the system set-up and improve the overall system robustness.

Example equations for extracting the cross line components follow:

$$E_{A,tot,proj} = E_{\|proj} - E_{\perp proj} \quad \text{(Eq. 1)}$$

$$E_{B,tot,proj} = E_{\|proj} \quad \text{(Eq. 2)}$$

$$E_{C,tot,proj} = E_{\|proj} + E_{\perp proj} \quad \text{(Eq. 3)}$$

$$E_{C,tot,proj} - E_{A,tot,proj} = 2E_{\perp proj} \quad \text{(Eq. 4)}$$

Figure 3:
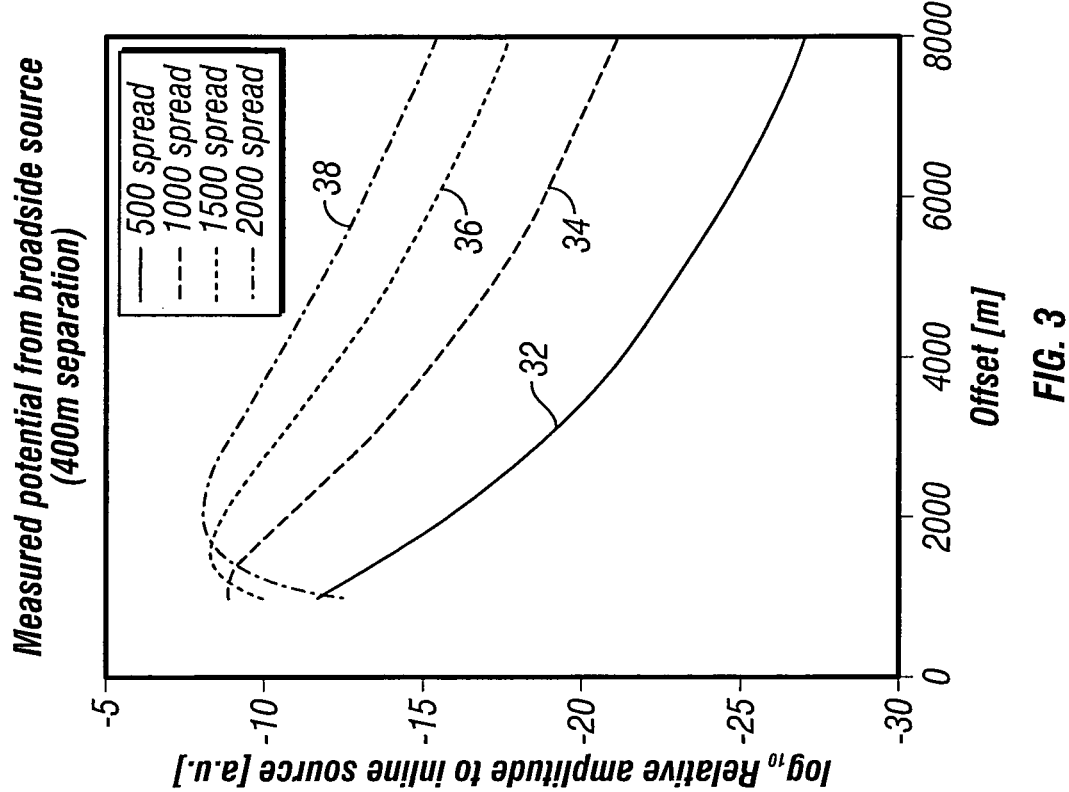
FIG. 3 shows a graph of normalized measured cross-line signal amplitudes for various source-sensor offsets and lateral extensions (spreads) symmetrical from the center of a cross-line transmitter.
Figure 2:
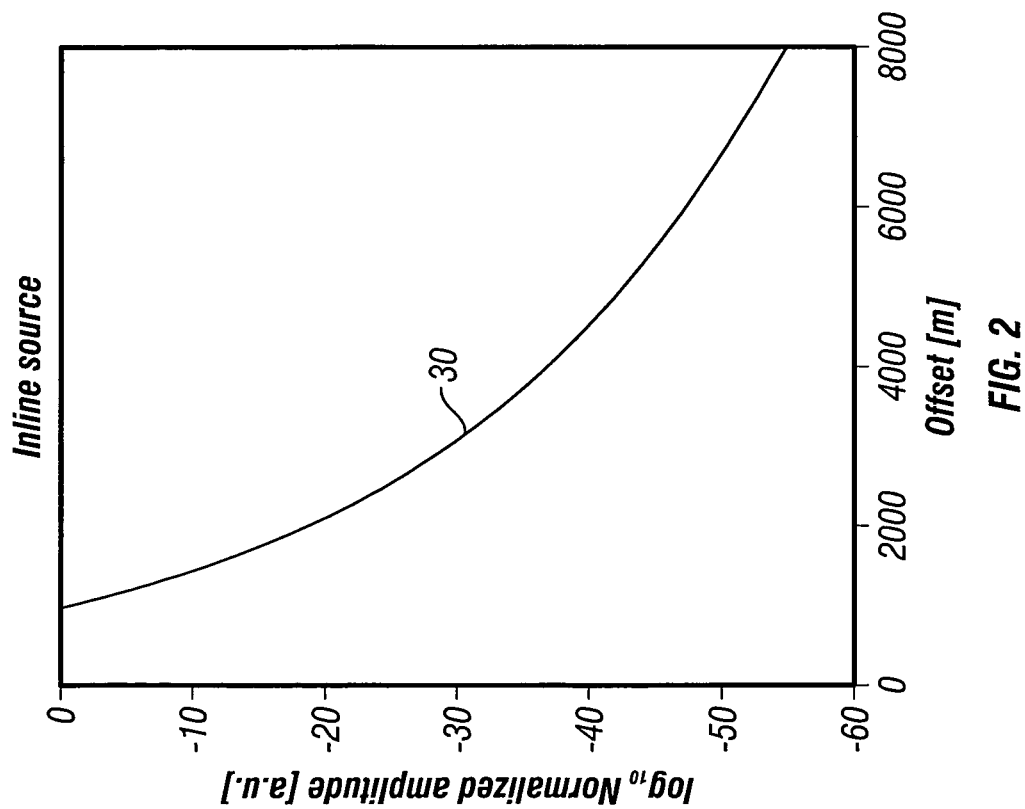
FIG. 2 shows a graph of normalized measured in-line signal amplitude with respect to source-sensor offset using an in-line transmitter.

By way of example, for an in-line transmitter electrode separation of 400 m, the normalized $E_{\|proj}$ component measured with a 200 m in-line electrode pair is depicted in FIG. 2. With a streamer spread of 2 km (1 km lateral distance on either side of the centerline), the measured $E_{\perp proj}$ has an amplitude which is at worst 13 dB lower over a 1-6 km source-sensor offset range than $E_{\|proj}$. The plot in FIG. 3 illustrates an exemplary cross-line signal sensitivity with respect to various spread separations (double the lateral separation of a single streamer from the centerline of the cross-line transmitter). This example indicates that it may be possible to optimize the streamer spread to achieve maximum sensitivity for a specific offset. As illustrated, a 500 meter spread is shown at curve 32, a 1000 meter spread is shown at curve 34, a 1500 meter spread is shown at curve 36, and a 2 km spread is shown at curve 38.

An EM survey method according to the invention may provide improved interpretation results while maintaining survey operating efficiency.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for marine electromagnetic surveying, comprising:
   transmitting a first electromagnetic field oriented in a first direction into a body of water;
   transmitting a second electromagnetic field oriented in a second direction into the body of water, wherein the second direction is substantially transverse to the first direction;
   measuring a parameter related to electromagnetic field amplitude at a plurality of longitudinally and laterally spaced apart positions along the first direction detected by a plurality of spaced apart receivers; and
   determining a value of the electromagnetic field amplitude in the second direction using the measured amplitudes along the first direction detected by the plurality of spaced apart receivers.

2. The method of claim 1 wherein the transmitting the first and second electromagnetic fields comprises passing switched direct current across corresponding spaced apart pairs of electrodes.

3. The method of claim 2 wherein the switched direct current comprises a pseudorandom binary sequences corresponding to each of the pairs of electrodes.

4. The method of claim 3 wherein the pseudorandom binary sequences have a cross correlation coefficient of substantially zero.

5. The method of claim 1 wherein the detecting comprises measuring voltage across pairs of electrodes oriented substantially along the first direction.

6. The method of claim 1 further comprising towing devices for detecting the parameter related to electromagnetic field amplitude.

7. The method of claim 1 further comprising towing a device for transmitting at least one of the first and second electromagnetic fields.

8. The method of claim 1 wherein:
   the transmitting the first electric field defines a first location;
   the transmitting the second electric field defines a second location; and
   the plurality of spaced apart positions are longitudinally and laterally spaced apart from the midpoint between the first and second locations.

9. A method for marine electromagnetic surveying, comprising:
   towing a first transmitter and a second transmitter through a body of water along a towing path;
   transmitting a first electromagnetic field oriented in a first direction into the body of water, wherein the first direction is substantially parallel to the towing path;
   transmitting a second electromagnetic field oriented in a second direction into the body of water, wherein the second direction is substantially transverse to the first direction;
   detecting a parameter related to electromagnetic field amplitude at a plurality of longitudinally and laterally spaced apart positions along the first direction detected by a plurality of spaced apart receivers; and
   resolving the detected electromagnetic field parameter into components along the first and second directions at at least one of the plurality of positions using the detected parameter from the plurality of positions.

10. The method of claim 9 further comprising towing devices for detecting the parameter related to electromagnetic field amplitude.

11. The method of claim 9 wherein:
    the transmitting the first electric field defines a first location;
    the transmitting the second electric field defines a second location; and
    the plurality of spaced apart positions are longitudinally and laterally spaced apart from the midpoint between the first and second locations.

12. A marine electromagnetic survey system, comprising:
    a first electromagnetic field source configured to transmit a first electromagnetic field oriented in a first direction into a body of water, wherein the first electromagnetic field source is disposed proximate a centerline of a sensor spread;
    a second electromagnetic field source configured to transmit a second electromagnetic field oriented in a second direction into a body of water, wherein the second direction is substantially transverse to the first direction;
    a plurality of electromagnetic sensors disposed on the sensor spread having dipole moments generally parallel to the first direction and configured to detect a
    parameter related to electromagnetic field amplitude at a plurality of longitudinally and laterally spaced apart positions along the first direction detected by a plurality of spaced apart electromagnetic sensors, wherein at least one electromagnetic sensor is disposed at a distance from the centerline; and
    a computer system configured to resolve an electromagnetic field parameter into components along the first and second directions using the detected electromagnetic field measurements made along the second first direction.

13. The system of claim 12 wherein the sensor spread is a streamer spread configured to be towed by a vessel.

14. The system of claim 12 wherein at least one of the first and second electromagnetic field source is configured to be towed by a vessel.

* * * * *

UNITED STATES PATENT AND TRADEMARK OFFICE
CERTIFICATE OF CORRECTION

PATENT NO. : 8,896,314 B2  
APPLICATION NO. : 12/799941  
DATED : November 25, 2014  
INVENTOR(S) : Gustav Goran Mattias Sudow Page 1 of 1

It is certified that error appears in the above-identified patent and that said Letters Patent is hereby corrected as shown below:

In claim 12, column 6, line 55, after, "field measurements made along the", delete "second."

Signed and Sealed this  
Sixteenth Day of February, 2016

Michelle K. Lee  
*Director of the United States Patent and Trademark Office*